April 27, 1926.
F. R. BENNETT
WINDSHIELD OR DEFLECTOR
Filed May 13, 1925
1,582,240
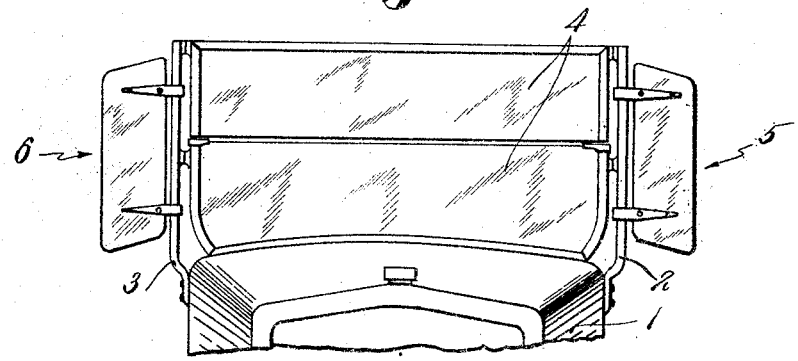
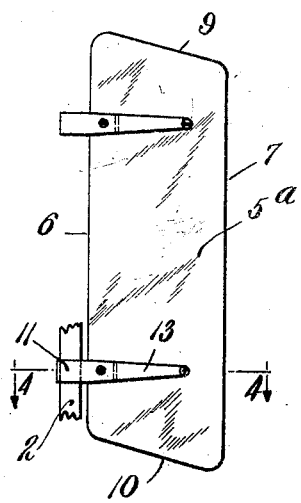
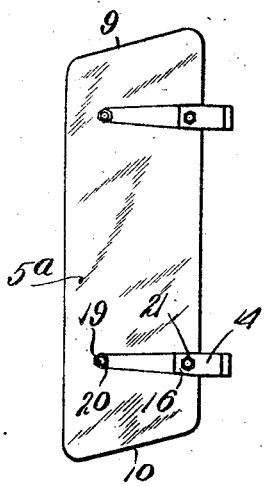
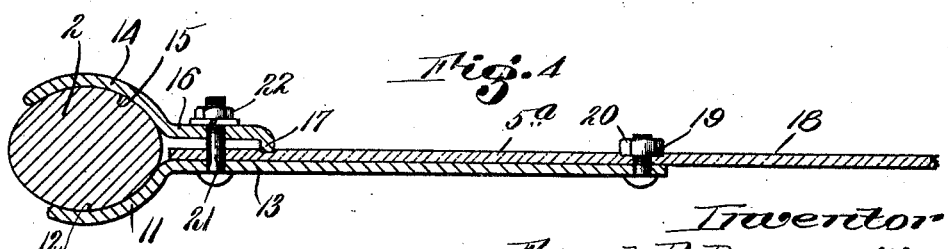
Inventor
Frank R. Bennett,
By Roberts Roberts Cushman
Attys.

Patented Apr. 27, 1926.

1,582,240

UNITED STATES PATENT OFFICE.

FRANK R. BENNETT, OF KEENE, NEW HAMPSHIRE, ASSIGNOR TO WILCOX COMB COMPANY, INC., OF KEENE, NEW HAMPSHIRE, A CORPORATION OF MASSACHUSETTS.

WINDSHIELD OR DEFLECTOR.

Application filed May 13, 1925. Serial No. 29,910.

*To all whom it may concern:*

Be it known that I, FRANK R. BENNETT, a citizen of the United States of America, and resident of Keene, in the county of Cheshire and State of New Hampshire, have invented new and useful Improvements in Windshields or Deflectors, of which the following is a specification.

This invention relates to wind shields for vehicles and more particularly to side shields or deflectors of the type commonly attached at either side of the usual front shield and which are intended to deflect the air currents laterally outward and away from the interior of the vehicle.

Such side shields or deflectors are, like the front wind shield, usually made of plate glass, for although it is not so essential for the driver to have clear and unobstructed vision through these side shields as through the front shield, it is not wholly desirable completely to cut off the view at this point.

These side shields are usually supported by means of brackets secured to the posts which carry the main wind shield and which may also constitute supports for the front of the vehicle top. The side shields are in most instances unprovided with frames, the glass being attached to the brackets by means of bolts or rivets passing through holes drilled in the glass.

Since glass has relatively little crushing strength it is necessary to interpose cushioning pads, for example felt or lead washers between the glass and the metal parts to which it is clamped or to bush the openings through which the bolts pass and allow the bushings to carry the clamping pressure.

The glass employed must necessarily be of substantial thickness to prevent it from breaking when subjected to the vibration and jar to which it is constantly exposed and thus the weight supported by the brackets is considerable. The permanent attachment of such heavy glass panels without clamping them directly to the brackets or without undue complexity of bracket construction is a difficult problem, particularly as the least play or looseness between the parts results in objectionable noise and rattling due to the hard and resonant character of the glass panel.

The plate glass employed for this purpose is expensive and there is a large loss of material through breakage during manufacture and in transportation, while such glass shields, in common with other glass employed in vehicle tops, adds to the probability of serious injury to the occupant of the vehicle in the event of collision.

In accordance with the present invention I have devised a side wind shield which provides the necessary wind protection without substantially obstructing the vision of the driver and which at the same time is substantially free from the disadvantages of the ordinary glass shield in that it comprises a deflecting panel which is light in weight; of a material which is relatively cheap, non-resonant, tough, and strong, and which may be worked without danger of fracture; which may be clamped directly to its supporting brackets by the use of bolts or rivets without danger of breaking it, which may be supported by means of light, simple and inexpensive brackets, two such brackets amply sufficing for the purpose; and which, if subjected to forces great enough to crush or break it, does not present dangerously sharp points or edges.

While many non-vitreous materials having some at least of the desired characteristics probably exist, I have found that transparent sheet celluloid and transparent bakelite possess to a superlative degree the qualities desirable in such a side shield. In accordance with my invention I employ such sheet celluloid or bakelite in making the deflector panel and support it by means of a pair of light and inexpensive brackets formed from sheet material which are directly attached to the shield proper by means of ordinary bolts.

In the accompanying drawings I have shown one preferred embodiment of the invention by way of example and in such drawings:

Fig. 1 is a fragmentary front elevation of an automobile showing the improved side shields or deflectors mounted thereon;

Fig. 2 is a front elevation to larger scale showing the left hand wind shield together with a fragment of the supporting post upon which it is mounted;

Fig. 3 is a rear elevation of the device shown in Fig. 2; and

Fig. 4 is a horizontal section, greatly enlarged, substantially on the line 4—4 of Fig. 2.

Referring to the drawings, the numeral 1 designates the forward part of an automobile body provided with the front posts 2 and 3 which support the usual front wind shield 4. These posts also furnish suitable supports for the side shields or deflectors 5 and 6.

Since the right and left side shields are of substantially the same construction the left hand shield only is hereinafter described in detail.

Referring to Figs. 2, 3 and 4, the shield or deflector panel indicated at 5ª consists of a piece of suitable sheet material preferably of elongate rhomboidal form having the front and rear vertical edges 6 and 7 respectively and the inclined top and bottom edges 9 and 10.

While this particular shape is preferred the invention is not in any manner restricted to the employment of a deflector panel of this particular shape as any suitable contour may be chosen. This deflector panel is preferably made of transparent sheet celluloid or transparent sheet bakelite and I have found by experiment that ordinary celluloid of a thickness of approximately ⅛ of an inch possesses sufficient stiffness and rigidity to withstand the wind pressure and the vibration to which it is subjected. Obviously a greater, or possibly a lesser thickness may be employed if circumstances should warrant.

While I prefer to employ a material which is completely transparent and colorless I may under certain circumstances substitute material which is translucent but not completely transparent, or I may employ transparent material of any suitable color.

The vertically elongate panel thus provided is supported by means of vertically spaced brackets, a single pair of such brackets being sufficient for the purpose. Each bracket comprises a jaw portion 11 (Fig. 4) preferably provided with a concave inner surface 12 adapted to engage the supporting post 2. The rear edge of this jaw portion is integrally united to an elongate attaching arm 13 which preferably tapers from its union with the jaw toward its free or rear extremity. The bracket also comprises a second relatively movable jaw 14 complemental to the jaw 11 and also preferably having a concave inner surface 15 for engagement with the post 2. This jaw is integrally united at its rear edge to an attaching member 16 which is substantially shorter than the member 13 and which also preferably tapers toward its free end. Preferably this attaching member 16 terminates in a gripping flange 17 directed inwardly towards the opposed attaching member 13.

While I have shown the jaws 11 and 14 as having concave inner surfaces these jaws may be formed with opposed faces of any desired contour, padded if desired, for properly gripping between them the supporting post upon which the bracket is mounted.

The member 13 is provided with a hole at its outer or smaller end and also with a hole near its union with the jaw 11. The member 16 is likewise provided with a hole which, in operative position, is aligned with the last named hole in the member 13.

The panel 5ª is provided with vertically spaced pairs of openings corresponding to the holes in the respective brackets and the forward edge portion of the panel is inserted between the attaching members 13 and 16 of each bracket. A bolt 19 passes through the hole in the smaller end of the member 13 and through one of the holes in the panel and is clamped to the panel by means of a nut 20 which engages the screw threaded end of the bolt and presses directly against the rear face of the panel. Since the material of the panel is resilient, the nut may be so tightened as to embed itself to some extent in the substance of the panel thus holding it securely and making it unnecessary to employ a lock nut or similar retaining device.

A bolt 21 extends through the other opening in the member 13 and through the panel and through the hole in the member 16 and the parts are clamped together by means of a nut 22 engaging the threaded end of this bolt. The bolt 21 and nut 22 have a twofold purpose in that they serve to clamp the jaws 11 and 14 about the post 2 and at the same time cause the gripping member 17 to bear forcibly against the rear face of the panel 5ª thus clamping the latter against the member 13.

If sufficient clamping pressure be employed, the member 17 embeds itself slightly in the substance of the panel and thus effectually prevents all lateral movement of the latter relative to the attaching members.

The two parts making up the bracket are preferably formed by stamping them from sheet material such for example as sheet steel of suitable thickness. These bracket elements may thus be formed in a single operation and at very low cost as compared with the brackets which are ordinarily provided for securing glass side shields in position. Since the improved shield here described is very light as compared with glass these brackets may be made relatively small so that they do not obscure any substantial part of the field of vision.

As the material of which the panel is made is flexible and not easily broken or cracked it may be made much thinner than a glass panel and may be clamped directly and forcibly against the parts of the bracket without the necessity of interposing soft or resilient pads between it and the clamping elements. These panels may be cut from sheet material by a stamping operation at extremely low cost as compared with the preparation of glass panels and if subjected to the shock of collision and broken thereby do not form sharp and jagged edges likely to injure the occupants of the vehicle.

Since the material employed is non-resonant it does not rattle loudly even though it should become loosened in its supporting bracket, while the reduction in weight is such that the brackets may be attached to the side posts with much less danger of injuring the finish upon the latter or of becoming displaced by vibration.

I claim:

1. A wind deflector or side shield for vehicles comprising a vertically elongate panel of transparent non-vitreous stiffly flexible sheet material, said panel having two longitudinally spaced pairs of openings therethrough, one opening of each pair being near the forward edge of said panel, a pair of brackets, each bracket comprising relatively movable clamping jaws for attachment to a part of a vehicle, and each bracket having a pair of openings corresponding to the openings in the panel, and bolts passing through the openings in the brackets and the transparent panel and firmly clamping the brackets directly against the surface of the panel.

2. A wind deflector or side shield for vehicles comprising a two part supporting bracket consisting of an elongate sheet metal member relatively wide at one end and tapering in width toward its other end, the wider end portion being deflected out of the plane of the remainder thereof and being concavely curved to constitute a clamping jaw, a second sheet metal member also having a wide, concavely curved jaw portion opposed to the jaw portion of the first member, and a short tapered portion, a deflecting element consisting of a panel of flexible transparent sheet material disposed between the tapered portions of the bracket members, a bolt securing the deflecting element directly to the small end of the first named bracket member, and a clamping bolt passing through the deflecting element and both bracket members near the jaw portions of the latter.

3. A wind deflector or side shield for vehicles comprising a pair of supporting brackets each consisting of a clamping jaw and an elongate attaching member extending from one edge of the jaw, a relatively movable clamping jaw opposed to the first jaw and having a relatively short attaching member projecting from one of its edges, the latter member having a gripping flange directed toward the opposed face of the first attaching member, a piece of flexible transparent sheet material having its forward edge portion interposed between the attaching members of the respective brackets, the latter being spaced longitudinally of said edge, a clamping bolt extending through both attaching members of each bracket for clamping said members against opposite sides of the piece of sheet material, and bolts securing the rearward ends of the elongate attaching members of the respective brackets directly to the sheet material.

Signed by me at Keene, New Hampshire, this 11th day of May 1925.

FRANK R. BENNETT.